United States Patent
Bonsky

[11] 3,941,934
[45] Mar. 2, 1976

[54] TELEPHONE ANSWERING SYSTEM
[75] Inventor: Elmer C. Bonsky, Columbus, Ohio
[73] Assignee: T.A.D. Avanti, Inc., Paramount, Calif.
[22] Filed: Sept. 13, 1973
[21] Appl. No.: 396,718

[52] U.S. Cl. ................ 179/6 R; 179/100.1 VC
[51] Int. Cl.² ........................................ H04M 1/64
[58] Field of Search ........... 179/6 R, 6 C, 100.1 VC

[56] References Cited
UNITED STATES PATENTS

| | | | |
|---|---|---|---|
| 3,133,992 | 5/1964 | Dickman | 179/100.1 VC |
| 3,688,043 | 8/1972 | Konno | 179/100.1 VC |
| 3,711,649 | 1/1973 | Ando | 179/100.1 VC |
| 3,728,488 | 4/1973 | Bonsky et al. | 179/6 R |
| 3,787,625 | 1/1974 | Sato | 179/100.1 VC |

*Primary Examiner*—Vincent P. Canney
*Attorney, Agent, or Firm*—Keith D. Beecher

[57] ABSTRACT

A telephone answering system of the voice actuated type is provided which transmits an announcement to the calling party during an announcement interval ($T_1$) and then records a message from the calling party during a subsequent message interval ($T_2$). The system is of the type in which the calling party may record a message of any length during the message interval ($T_2$) within the recording capabilities of the instrument, so long as he continues to talk. The particular system of the invention includes a circuit which effectively hangs up and removes the system from the telephone line for a brief instant at the end of the announcement interval ($T_1$), so that the dial tone may be re-established on the telephone line at the beginning of the message interval ($T_2$), instead of the busy signal, in the event the calling party hangs up during the announcement interval ($T_1$) period. The voice actuated circuitry used in the system does not respond to the tone signal, and automatically hangs up upon the receipt of the tone signal after a short time. However, if a busy signal, rather than the tone signal, is on the line at the beginning of the message interval ($T_2$), the system would otherwise respond to the busy signal, as to a speech signal, and record the busy signal during the entire message interval ($T_2$).

2 Claims, 1 Drawing Figure

U.S. Patent   March 2, 1976   3,941,934
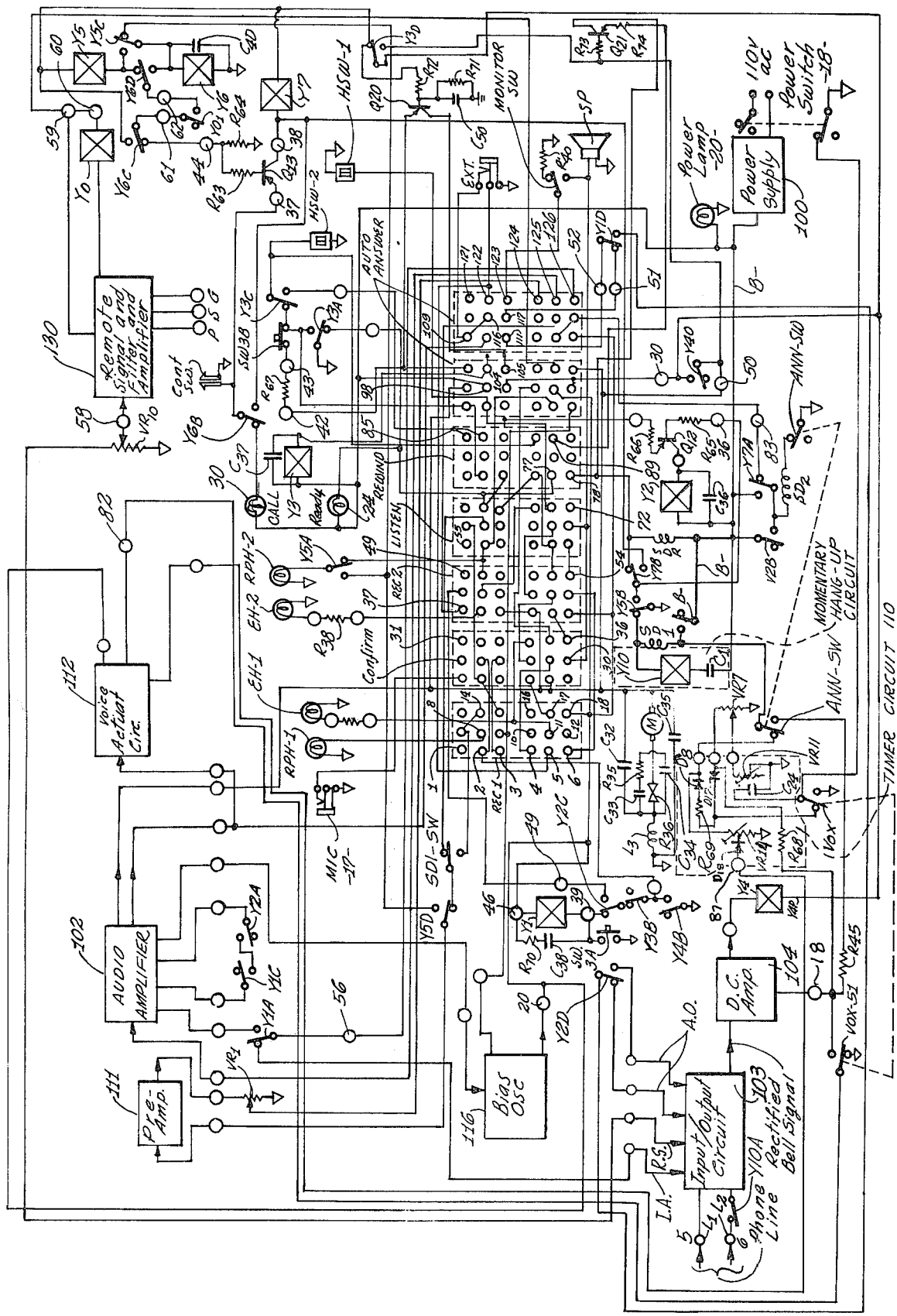

TELEPHONE ANSWERING SYSTEM

BACKGROUND OF THE INVENTION

The telephone answering system and apparatus of the invention is of the general type which includes a sensing circuit that responds to a ring signal on the telephone line to activate the answering instrument. When the instrument is so activated, a recorded announcement is transmitted to the calling part over the telephone line during an announcement interval ($T_1$). A message recording tape is then activated within the answering instrument in order that the calling party may record his message. In the apparatus to be described, the message recording equipment is voice actuated, so that the calling party is not limited to any particular prescribed time interval in which to record his message. Instead, as long as he continues talking, the message is recorded.

However, problems occur in the voice actuated type of telephone answering system. These problems arise, for example, when the calling party hangs up during the announcement interval ($T_1$). In most telephone systems, a busy signal occurs on the line a short time after the calling party hangs up. This means that, should the calling party hang up before the end of the announcement interval ($T_1$), the telephone answering system enters the message interval ($T_2$) when a busy signal is being received on the telephone line. Most voice actuated telephone answering systems cannot distinguish between busy signals and normal speech, so that when a busy signal is received the equipment remains activated during the entire length of the message interval ($T_2$), so that the message tape is entirely wasted since only the busy signal is recorded on it.

However, most voice actuated telephone answering systems of the type under consideration are capable of distinguishing the usual dial tone from the voice signals on the telephone line. Therefore, if a dial tone is received during the message interval ($T_2$) the system automatically hangs up, and is returned to a standby condition for the next message.

The circuitry of the present invention hangs up and effectively disconnects the telephone answering system from the telephone line for a brief interval at the end of the announcement interval ($T_1$), so that a tone signal is re-established on the telephone line if the calling party has hung up during the announcement interval ($T_1$), the tone signal continuing for a sufficient time into the ($T_2$) message interval, so that the telephone answering system can hang up before the tone signal turns into a busy signal, as is the usual occurrence in most telephone answering systems after a certain interval.

The circuitry of the invention is extremely simple in its concept, and can easily be installed into existing telephone answering systems of the voice actuated type.

BRIEF DESCRIPTION OF THE DRAWING

The single FIGURE is a diagram, partly in block form and partly in circuit detail, of a voice activated type of telephone answering system, and which includes the circuitry of the present invention, such as described briefly above.

DETAILED DESCRIPTION OF THE ILLUSTRATED EMBODIMENT

The telephone answering system illustrated in the drawing is of the type which is used directly with the telephone line, and it may be plugged into a usual telephone jack. The system, as will be described, has the feature in that it operates independently of the telephone instrument, and it does not require the telephone instrument to be placed on top of it, as is the case with most prior art units.

The apparatus and system as shown in the FIGURE is of the general type described in more detail in copending application Ser. No. 238,470.

The particular illustrated system may be switched to provide either a fixed time for recording each incoming call; or a voice activated recording interval ($T_2$), so that an incoming call continues to be recorded so long as the calling party continues to speak. By the inclusion of the circuitry of the present invention, the telephone answering system briefly hangs up at the end of the announcement interval ($T_1$) to assure that a dial tone will be restored to the telephone line at the beginning of the message recording interval ($T_2$), in the event that the calling party hangs up during the announcement interval ($T_1$). The voice activated circuit of the telephone answering system then rejects the dial tone, deactivates the system, and returns it to its standby mode, within a short time following the beginning of the message interval ($T_2$).

In the system illustrated in the drawing, a microphone may be plugged into a receptacle 17 for recording announcements, as will be described. A series of pushbutton switches are included, and these are designated "Auto Answer", "Rewind", "Listen", "Confirm", "Record 1", and "Record 2". A thumb operated "On-Off" power switch 18 is also included, as well as a thumb actuated volume control 22. In addition, a series of indicator lights designated "Power", "Ready" and "Call" are included in the system, these lights being designated 20, 24 and 30 respectively.

In order to install and operate the system shown in the drawing, it is plugged into a usual 110-volt alternating current output, and it is also plugged directly into a telephone jack, or otherwise connected to a telephone line.

The telephone answering system is equipped with a loop announcement tape on which an announcement is recorded, so that any time a telephone ring signal is received, a recorded announcement may automatically be transmitted to the caller. Incoming calls may be listened to by setting a monitor switch on the back of the housing 10. This connects a speaker "SP" into the circuit, so that incoming messages may be monitored as they are being recorded. Outgoing calls may be made merely by turning off the instrument and by using the telephone in a normal manner.

A remote control unit permits the system to be operated from a remote point. This is achieved by dialing the phone number of the telephone serviced by the instrument, and by then depressing a push-button on the remote control unit. This causes the remote control unit to emit a distinct tone which is transmitted over the telephone line and which is picked up by the circuitry of the system. When the remote control unit is operated from the remote point, the message tape in the system is caused to rewind to its origin position, and it is then caused to move forward so that the various messages recorded on the tape may be reproduced and transmitted by the telephone over the telephone lines to the remote point at which the caller is situated.

The system includes a loop magnetic announcement tape on which the announcement to be transmitted over the telephone line is recorded. The announcement is recorded on the tape by means, for example, of a record/playback head (RPH-1), and the announcement may be erased from the tape by means of an erase head (EH-1). The announcement tape is actuated whenever the solenoid (SD-1) is energized. A microswitch SD-1-SW is associated with the announcement tape transport. This switch is operated whenever the announcement tape transport is actuated, and it serves to switch the circuitry to a transmit mode so that the recorded announcement may be transmitted over the telephone line, as will be described.

A message tape is driven by a pinch roller assembly, which is selectively moved against a rotating capstan to drive the tape when a solenoid (SD-2) is energized. The record/playback head (RPH-1) is provided in conjunction with the message tape, as well as an erase head (EH-2). During rewind, the tape is moved from the left to the right, as it is rewound on the feed reel when a solenoid SDR is engaged. As shown in the diagram, for example, the system may be connected directly to the telephone line, as designated by the terminals 5 and 6, so as to respond to the ring signals on the line.

The push-button switches described above are six-pole, double-throw switches. For example, when the "Record 1" pushbutton switch is not actuated, its common terminals 2, 8 and 14 connect respectively with the upper terminals 1, 7 and 13, and its lower common terminals 5, 11 and 17 connect respectively with its upper terminals 4, 10 and 16. However, when the push-button switch is actuated, its common terminals 2, 8 and 14 connect respectively with its lower terminals 3, 9 and 15, whereas its common terminals 5, 11 and 17 connect respectively with its lower terminals 6, 12 and 18. This also applies to the "Hold" pushbutton switch, the "Record 2" push-button switch, the "Listen" push-button switch, the "Rewind" push-button switch, and the "Auto Answer" push-button switch.

As a preliminary setting for the system, it will be assumed that the "Auto Answer" push-button switch has been depressed, so that the system is in the standby mode awaiting an incoming ring to set it in operation. For that mode, the common terminals 92, 98, 104, 110, 116 and 122 of the "Auto Answer" pushbutton switch are connected respectively to the terminals 93, 99, 105, 111, 117 and 123; and the common terminals 95, 101, 107, 113, 119 and 125 are connected respectively to the terminals 96, 102, 108, 114, 120 and 126.

For the actuated position of the "Auto Answer" switch, and when the power switch 18 is on, the power supply 100 is energized, so that a negative direct voltage is applied to the lead designated B−. This negative voltage causes the Power lamp 20 to be energized. Also, the message tape is assumed to be at its origin position, so that the switch CONT-SW is closed, and so that the "Call" lamp 30 is energized. The Ready lamp 24 is also on, as its path is returned through the normally closed contact Y3A to ground.

In accordance with the invention, a relay Y10 and a series capacitor C1 are connected from one terminal of the control solenoid SD1 to the negative terminal B− of the power source. The relay Y10 operates a pair of normally closed contacts Y10A in the lead connecting the input terminal $L_2$ to the input/output circuit 103.

Now, should a ring signal be received over the telephone line, the ring signal is introduced by way of the input terminals $L_1$ and $L_2$ through the normally closed contacts Y10A to the input/output circuit 103. The ring signal from the input/output circuit 103 is introduced to a direct current amplifier 104, the output of which is connected to a relay Y4. In response to the ring signal from the input/output circuit 103, the direct current amplifier draws current through the relay Y4 to energize the relay. The relay contacts Y4B now close when the relay Y4 is energized, causing the relay Y1 to be energized. When the relay Y1 is energized, the contacts Y1A close so that the incoming messages may be fed to the audio amplifier 102.

When the relay is energized, it also closes the contacts Y1B so as to connect the negative lead (B−) to a timer circuit 110. The timer circuit is energized through normally closed contacts of one section of an announce-record switch. These contacts are connected through a diode D8 in the timer circuit to a 400 ohm resistor R69. The resistor R69 is connected back through a diode D17 to a 100 kilo-ohm potentiometer VR7. The potentiometer VR7 is connected to a further 10 kilo-ohm potentiometer VR11 which, in turn, is connected to ground. The potentiometer VR7 is also connected to a 5 kilo-ohm resistor R68 which is connected back to the DC amplifier 104 by way of the terminal 18 of that amplifier.

The contacts of the announce-record switch are also connected to a grounded potentiometer VR14 having a resistance of 10 kilo-ohms. The output terminal 82 of the voice actuated circuit 112 is connected to that potentiometer through a silicon diode D18. The terminal 82 of the voice actuated circuit is connected by way of one section of a VOX-SW switch to the input terminal 18 of the DC amplifier 104. The VOX-SW switch has a further section with normally closed contacts connected to a capacitor C24 and to the junction of resistor 69 and diode D19, and with normally open contact connected to ground. The capacitor C24 may have a capacity of 100 microfarads and it is grounded.

When the two sections of the VOX-SW switch are in their illustrated positions, the system is set for a predetermined time interval for recording calls on the message tape, the time interval being established by the discharge time of the capacitor C24 through the various resistances and potentiometers associated therewith. However, when the two sections of the VOX-SW switch are in the other position, the time interval of each message is controlled by the output from the voice actuated circuit 112, so that as long as the calling party continues talking, his message is recorded on the message tape.

The latter control is accomplished by the voice actuated circuit 112, as described in detail in the aforementioned copending application, the voice actuated circuit 112 being energized only when the VOX-SW switch is placed in its second position.

As described above, the voice actuated circuit 112 does not respond to the dial tone. Therefore, should the dial tone occur during the message recording interval ($T_2$), the voice actuated circuit will cause the system to be disconnected from the telephone line and return to its standby condition, awaiting the next call. The relay Y4 is held energized during the voice actuated mode (Vox), so long as the calling party is speaking. However, when the calling party hangs up, resulting either in silence on the phone line or a continuous dial tone, the voice actuated circuit causes the relay Y4 to become de-energized so as to disconnect the system from the telephone line. In the timed mode, the relay Y4 is held energized so long as the capacitor C24 in the timer circuit 110 retains its charge. In each case, the relay Y4 remains energized so long as the terminal 18 of the DC amplifier 104 is sufficiently negative to maintain the relay Y4 energzied.

As mentioned above, the initial energizing of the relay Y4 by the received ring signal causes the contacts Y4B to close, so that the relay Y1 is energized to set the system to the announcement transmitting mode ($T_1$). It will be appreciated that so long as the relay Y1 is energized, the timing cycle of the timer or of the voice actuated circuit 112 does not begin. This is because the capacitor C24 of the timer circuit is maintained in its charged state during the announcement mode by the closed contacts Y1B, so that the appropriate bias is applied directly to the DC amplifier 104 to hold the relay Y4 energized.

It is only after the relay Y1 is de-energized, and the system is switched to its message receiving and recording mode ($T_2$) by the energization of the relay Y2, that the timing cycle begins. The relay Y4 is de-energized a certain time after the beginning of the message recording mode to disconnect the system from the telephone line. The particular time interval depends upon whether the system is in the fixed message recording time mode, or is set to the voice actuated message recording time mode.

The energizing of the relay Y4 when the system is first switched from its standby mode to its announcement mode by the receipt of a telephone ring signal also causes the relay contacts Y4D to close to energize the motor M. The motor circuit M, as shown, includes a filter choke L3, and it also has an associated filter network including capacitors C32, C33, C34 and C35. These capacitors have values of 0.1, 10, 0.01 and 0.5 microfarads respectively. The filter network also includes a resistor R36 having a resistance, for example, of 10 ohms.

The motor M remains energized so long as the system is operational. The motor drives both the announcement tape 60 and the message tape 64 when their corresponding pinch roller assemblies are actuated by the selective energization of the solenoids SD-1 and SD-2. When the relay Y1 is energized, the system is set to its announcement mode, and the relay contacts Y1B close to charge the capacitor C24 in the timer circuit 110 so as to apply the necessary bias to the amplifier 104 to hold the relay Y4 energized. The solenoid SD-1 is also energized during this mode, and this solenoid actuates the pinch roller assembly associated with the announcement tape transport (not shown) and causes the announcement tape to be driven. The playback head RPH-1 associated with the announcement tape senses the announcement on the tape, and applies the audio signals corresponding to the announcement through the microswitch SD1-SW (which is now actuated) to the pre-amplifier circuit 111. The output from the pre-amplifier is then applied to the input/output amplifier 102 and the amplified output from the latter amplifier is applied to the input/output circuit 103, so that the announcement may be applied to the telephone line.

During the announcement mode, as as described above, the relays Y4 and Y1, and the solenoid SD-1 are energized, and the announcement signal is read by the playback head RPH-1, passed through the actuated switch SD1-SW, and amplified by the amplifiers 111 and 102. The amplified announcement from the amplifier 102 is applied to the input/output circuit 103 through the contacts Y2D and terminal 16. In this way, the recorded announcement on the announcement tape is transmitted over the telephone line to the calling party during the announcement mode interval ($T_1$). At the end of the announcement mode interval ($T_1$), the relay Y2 is energized. The system is now switched from its announcement mode when relays Y4 and Y1 were energized, to its message receiving mode when the relays Y4 and Y2 are energized.

The energization of the relay Y2 is achieved through the closed contacts 92 and 93 of the actuated "Auto Answer" pushbutton switch, and through a 5 ohm resistor connected to the emitter of the transistor Q12, the collector of which is connected to the relay Y2. The other terminal of the terminal Y2 is connected to the B— lead. When the relay Y2 is energized, the relay contacts Y2C are actuated so as to de-energize the relay Y1. This causes the contacts Y1B to open removing the unidirectional potential from the timer circuit 110, and initiating the timing cycle. At the same time, the contacts Y2B close energizing the solenoid SD-2 which causes the message tape to be actuated. The incoming message from the calling party is now recorded by the head RPH-2 on the message tape.

The incoming message is amplified in the amplifier 102, and its output from terminal 78 is applied to the bias oscillator 116 by terminal 23 to modulate the alternating current bias output signal. Then, the modulated bias signal is applied to the switching contact 96, and then to the switching contact 95, and from there to the record head RPH-2 through the switch contact 56. Therefore, during the message recording mode, the incoming message signal modulates the alternating current signal from the bias oscillator, and the resulting modulated signal is recorded on the message tape by the record head RPH-2.

At the same time, the output from the input/output amplifier 102 is fed to the switch contact 110 by the output terminal 74, and from there it is switched to the switch contact 111 and through the normally closed relay contacts Y1D to the switch contact 117, and from there to the switch contact 116, and through the switch contact 109 to the extension jack marked "Ext". Therefore, the incoming messages may be monitored, merely by plugging a speaker into the extension jack "ext". The incoming messages may also be monitored by the speaker SP by moving the adjacent "Monitor" switch to the down position.

It will be understood, therefore, that during the announcement mode, the relays Y4 and Y1 are energized so that the announcement tape is actuated and the timer circuit 110 is set. During the message receiving and recording mode, the relay Y4 remains energized, and the relay Y2 is energized, but the relay Y1 is de-energized. When the relay Y1 is de-energized, the solenoid SD1 is deactivated so that the announcement tape is stopped at its origin position, as established by the closure of the switch HSW-1.

When the solenoid SD1 is first activated at the beginning of the announcement interval ($T_1$), a current pulse flows through the relay Y10 which opens briefly the relay contacts Y10A. However, this current through the relay Y10 rapidly drops to zero as the capacitor C1 becomes charged, and the relay contacts Y10A return to their normally closed condition, permitting the system to transmit the recorded announcement to the calling party during the announcement interval ($T_1$). When the solenoid SD1 is de-energized at the end of the announcement interval ($T_1$), another current pulse flows briefly through the relay Y10 as the capacitor C1 discharges, and again the relay contacts Y10A open briefly. Should the calling party hang up during the announcement time interval ($T_1$), the brief interruption effectuated by the opening of the relay contacts Y10A at the end of the announcement interval ($T_1$) effectively causes the system to hang-up and thereby causes the tone signal to be re-established on the telephone line, so that the system will enter its message mode ($T_2$) with a tone signal on the line, rather than a busy signal. As mentioned above, the voice actuated circuit 112 does not respond to the tone signal, so that the system is rapidly deactivated and returned to its standby position, as is desired. Specifically, it causes the relay Y4 to be de-energized.

When the relay Y4 is de-energized, the system returns to its standby mode. The contacts Y4B return to their normally open position, and the relay Y1 cannot again be energized until the relay Y4 is again energized. The relay Y2 is also de-energized at this time, causing the contacts Y2B to open and thereby de-energizing the solenoid SD2 to stop the messasge tape. When Y4 is de-energized, the relay Y2 is de-energized since the contacts Y2C not only serve to de-energize Y1 when Y2 is energized, but also form a holding circuit for the relay Y2. Then, when the relay Y4 is de-energized the contacts Y4B open to open the holding circuit for the relay Y2, and therefore the relay Y2 also is deenergized.

The relay Y2 is shunted by a 200 microfarad capacitor C36, and the relay Y1 is shunted by a 500 microfarad capacitor C38 and a 100 ogm series resistor R70. During the transition from the announcement mode to the message recording mode, during which the relay Y1 is de-energized and the relay Y2 is energized, the circuit C38, R70 produces a slight delay in the de-energization of the relay Y1, and an internal oscillation is set up when both Y1 and Y2 are on at the same time briefly, as the contacts Y1C and Y2A are closed setting a regenerative feedback path in the amplifier 102. This produced a "beep" tone which is recorded on the message tape at the beginning of each message, and which serves as a message separation on the message tape.

The message tape is now ready to receive and record the incoming messages. The message tape continues to record messages during the message interval ($t_2$) until an end of tape sensing element causes the switch contacts HSW-2 to close. When that occurs, the circuitry of the transistors Q20 and Q21 switches the system to the "announce-only" mode. During the "announce-only" mode, the announcement tape continues to be activated in response to incoming messages and announcements are transmitted to the calling party. However, no further messages are recorded on the message tape.

The rewind operation is instituted by actuating the "Rewind" push-button switch which comprises the switch contacts 73-90. This, as mentioned above, causes the contacts 74, 80 and 86 to break with the contacts 73, 79 and 85, respectively, and to engage the contacts 75, 81 and 87; and causes the contacts 77, 83 and 89 to break with the contacts 76, 82 and 88, and to engage selectively with the contacts 78, 84 and 90. When the "Rewind" pushbutton switch is depressed, a ground is established at the upper end of the rewind solenoid SDR through the switch contacts 77 and 78, and through normally closed contacts Y3A of a protective relay Y3. The rewind solenoid SDR remains energized until the protective relay Y3 is employed. The rely Y3 is shunted by a 200 microfarad capacitor C37. The energizing of the solenoid SDR causes the message tape 64 to rewind until the sensing element 65 causes the switch G-SW2 to close. When that occurs, the protective relay Y3 is energized through the start switch SW3B, through a 10 kilo-ohm resistor R67, through the circuit of a transistor Q20, and through switch contacts 105 and 104.

When the protective relay Y3 is energized, the normally closed contacts Y3A open to cause the rewind solenoid SDR to be de-energized, and the normally open contacts Y3A close to form a holding circuit for the relay Y3. The normally closed contacts Y3B also open to assure that the relay Y1 is de-energized, and the normally open contacts Y3C close. When the contacts Y3C close, the message mode relay Y2 becomes energized to energize the solenoid SD2 to cause the message tape to start in its forward direction. The message tape moves forward until the element 65 moves off the switch HSW-2. When that occurs, the relay Y2 is de-energized, and the system is ready for the next cycle.

It should be noted that when the "Auto Answer" switch is off, the B– lead is connected by the switch contacts 98 and 97 directly to the terminal 72 to energize the pre-amplifier 112 and input/output amplifier 102 and to the motor M so that the drive motor is energized. Also, the (B–) is applied to the contacts 35, 40 and 41 of the "Record-2" switch, so as to exert a bias through the 1.5 kilo-ohm resistor R38 on the erase head EH-2. This means that all previous recordings are erased by the erase head prior to the new recordings being made on the tape by the head RPH-2. As mentioned above, if the "Rewind" button is pushed at the same time as the "Record-2" button, the message tape may be erased during the rewind operation.

The output terminal 74 of the input/output amplifier 102 is also connected to the input terminal 81 of the voice actuated circuit 112. The exciting potential for the voice actuated circuit is applied to the terminal 84 whenever the adjacent Vox-SW switch is set to the upper position. So long as the Vox-SW switch is in the illustrated position, the voice actuated circuit 112 is not active, and that occurs when the system is set in its timed mode, and the timer circuit 110 establishes a predetermined time interval for each message to be recorded on the message tape. As mentioned above, when the voice actuated circuit 112 is active, the messages may continue to be recorded on the message tape so long as there is an audio input to the voice actuated circuit.

So long as the capacitor in the voice actuated circuit 112 remains charged, the output terminal 82 causes a negative bias to be applied to the DC amplifier 104, so that the relay Y4 is held energized, which is essential to maintain the system effectively connected to the telephone lines. The timer capacitor C24 in the timer circuit 110 is disconnected and discharged at this time by the silicon diode of the Vox-SW switch adjacent the timer circuit. However, at the end of an incoming message, the capacitor C22 begins to discharge through the resistor R44 and through the associated potentiometer VR13 in the timer circuit 110, as described above. The parameters of the resistance-capacitance circuit are such that the discharge time constant is relatively fast, as compared with the discharge time of the capacitor C24 in the timer circuit when the system is in the fixed time message recording mode of operation.

A feature of the system is that it may be controlled from a remote point, and merely by introducing a tone of a predetermined frequency into the telephone line. The system must be in the "Auto Answer" push-button switch must be actuated. Assuming at that time that a number of previous messages have already been recorded on the message tape, then, upon receipt of the tone signal, the system is automatically placed in the "Rewind" mode, so that the message tape is rewound to its origin position. The system is then placed in its "Listen" mode, and the messages recorded on the message tape are now, instead of being fed into the loudspeaker SP, it is fed through the input/output amplifier 102 to the telephone line so that the messages may be heard by the person originating the tone signal.

When the proper tone is received, and the relay Y0 is energized, the contact Y01 closes, so that the relay Y5 is energized, as the circuit is completed through the normally closed contacts Y6C and Y6D, and through the grounded 40 ohm resistor R64. The relay Y6 is also energized at this time as the contacts Y5C close. The relay Y0 drops out when the tone signal stops, but the relays Y5 and Y6 remain energized. The rewind solenoid SDR is now energized as the relay contacts Y5B close, so that the message tape 64 is rewound to its origin position. When the message tape reaches its origin position at the end of the rewind operation, the switch CONT-SW closes to energize the relay Y7. The normally closed relay contacts Y7B now opens to de-energize the solenoid SDR.

The message solenoid SD2 is now energized through the closed contacts Y7A, and the message tape 64 begins to move in its forward direction. The recorded messages on the message tape are sensed by the head RPH-2 and are applied through the closed relay contacts Y5A and Y5D and through the switch SD1-SW to the preamplifier 111. The amplified signals are further amplified by the input/output amplifier 102. The output from the input/output amplifier 102 is applied across the "Auto Answer" switch contacts 110 and 111, and across the closed relay contacts Y1D, and through the normally closed relay contacts Y2D, to the input/output circuit 103 for transmission over the phone lines to the person originating the tone.

It might be pointed out that during the remote mode, the relay Y2 is not energized, and the message solenoid SD2 is activated by the relay Y7, as described above. The relay Y1, however, is energized. Even though the relay Y1 is energized, the announcement tape solenoid SD1 is not energized during the remote mode because the normally closed relay contacts Y5B are now open. It might also be pointed out that during the remote mode, the negative potential B− is applied to the lead connected to the remote signal filter and amplifier 130 and to the relays Y0, Y5 and Y7, the connection being completed through the switch contacts 107 and 108, 99 and 98 of the actuated "Auto Answer" push-button switch, and through the closed relay contacts Y4D. The normally closed relay contacts Y3D energize the circuit of the transistor Q20 at this time through a 10 kilo-ohm resistor R72 connected to the base of the transistor. The base is also connected to a grounded 30 kilo-ohm resistor R71 which is shunted by a 470 microfarad capacitor C50.

After the calling party has received the messages from the message tape, he should again transmit the tone signal over the telephone line. If this is done, the relay Y0 is again energized which causes the relay contacts Y0 to close shorting out the relay Y5 and causing it to be de-energized. Then, when the tone is terminated, the relay Y6 is de-energized which causes the relay Y7 to be de-energized and the message tape 64 to be stopped at that point, and the system is now in readiness to receive and record additional messages. The calling party may then transmit a further tone over the telephone lines, and the further tone will set the system to the rewind mode, as mentioned above, so as to return the message tape to its origin position. At that point, the calling party may transmit yet a further tone signal to stop the message tape at its origin position, so that the system is then in readiness to receive and record an entirely new set of messages.

As mentioned above, the system may be set to an "Announce Only" mode. When in such a mode, no messages are recorded, and the system responds to incoming calls only by transmitting the announcement on the announcement tape over the telephone line to the calling party. The instrument may be set to the "Announce Only" mode by moving the Announce-Record switch from it illustrated position to its second position.

A first section of the Announce-Record switch is connected to the solenoid SD2, so that when the switch is moved to its second position, the solenoid cannot be energized so that the message tape 60 cannot be activated. A second section of the Announce-Record switch switches the SD1 solenoid from the timer circuit 110 to the DC amplifier 104 through a 100 kilo-ohm resistor R45 so that the system remains activated only for the duration of the announcement, and is then de-energized.

The invention provides, therefore, an improved telephone answering system which incorporates a voice actuated circuit, and which assures that the voice actuated circuit will be effective to return the system to the standby mode, in the event a calling party should hang up during the announcement mode of operation of the system.

While a particular embodiment of the invention has been shown and described, modifications may be made. It is intended in the claims to cover the modifications which come within the spirit and scope of the invention.

What is claimed:

1. In a telephone answering system for responding to telephone calls received over a telephone line and which comprises an announcement storage means and a message storage means and respectively associated transducers, and first and second means for driving said announcement storage means and said message storage means respectively relative to said transducers for producing a recorded announcement from the announcement storage means in response to an incoming telephone call during an announcement interval ($T_1$) and for subsequently recording a message from the calling party on said message storage means during a message interval ($T_2$), the combination of: first control circuit means for activating said announcement storage driving means in response to said incoming telephone call to reproduce said recorded announcement for transmission to the calling party during the announcement time interval ($T_1$) and for de-activating said announcement storage driving means at the end of the announcement time interval ($T_1$), so as to initiate the recording of the aforesaid message from the calling party on said message storage means during a subsequent time interval ($T_2$); second control means coupled to said first control circuit means for developing a control signal during the time interval ($T_2$) in response to discontinuous audio signals corresponding to said message for application to said first control circuit means to maintain said message storage driving means activated as long as said message continues; and hang-up circuit means connected to said first control circuit means for effectively disconnecting the telephone answering system from the telephone line for a brief interval at the end of the announcement interval ($T_1$), thereby to re-establish a dial tone on the telephone line at the beginning of the message interval ($T_2$) in the event the incoming telephone call is terminated during the announcement interval ($T_1$).

2. The combination defined in claim 1, in which said hang-up circuit means comprises a series-connected relay and capacitor, and normally-closed relay contacts connecting the system to the telephone line and operated by said relay.

* * * * *